United States Patent
Mimura

(10) Patent No.: US 6,724,109 B2
(45) Date of Patent: *Apr. 20, 2004

(54) RESOLVER STATOR

(75) Inventor: Hisashi Mimura, Nagano-ken (JP)

(73) Assignee: Tamagawa Seiki Kabushiki Kaisha, Nagano-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 13 days.

(21) Appl. No.: 10/002,199

(22) Filed: Dec. 5, 2001

(65) Prior Publication Data

US 2003/0006666 A1 Jan. 9, 2003

(30) Foreign Application Priority Data

Jul. 9, 2001 (JP) .................................. 2001-207965

(51) Int. Cl.[7] .............................. H02K 5/04; H02K 15/00
(52) U.S. Cl. .................................. 310/71; 310/254
(58) Field of Search ..................... 310/71, 254, 43, 310/260

(56) References Cited

U.S. PATENT DOCUMENTS

| 3,735,797 A | * | 5/1973 | Jeanneret | 427/135 |
| 5,057,732 A | * | 10/1991 | Fukaya | 310/71 |
| 6,028,383 A | * | 2/2000 | Ohshita | 310/71 |
| 6,031,307 A | * | 2/2000 | Ohshita | 310/71 |
| 6,044,545 A | * | 4/2000 | Ohshita | 310/71 |

* cited by examiner

Primary Examiner—Burton S. Mullins
Assistant Examiner—Karen Addison
(74) Attorney, Agent, or Firm—Sughrue Mion, PLLC

(57) ABSTRACT

A resolver stator includes a stator coil which is fixed to magnetic poles of the resolver stator by a resin softer than an epoxy, whereby disconnection in the stator coil is avoided when the resolver stator is used in an environment in which temperature varies in a wide range. Wire ends of the stator coil are each wound around a terminal and fixed thereto such that one part of the wound wire end is left free from the terminal, whereby disconnection of wires is avoided.

10 Claims, 6 Drawing Sheets

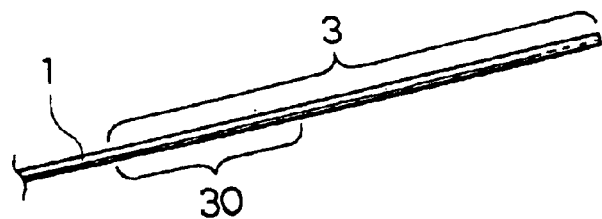
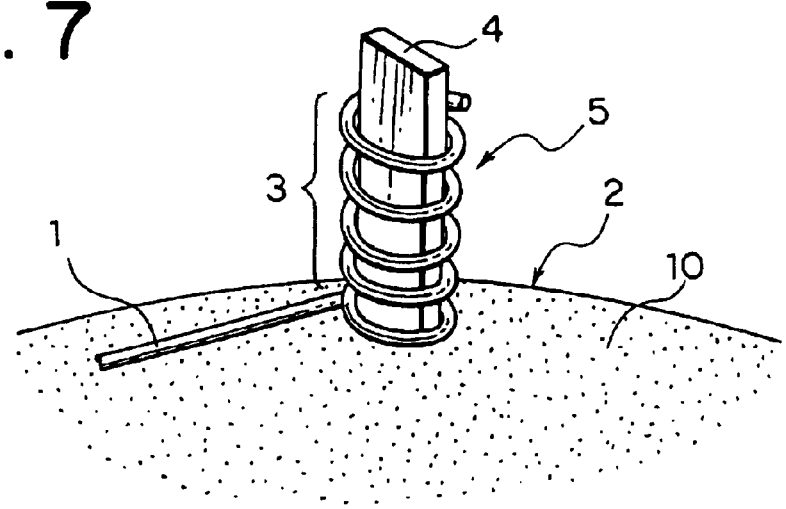
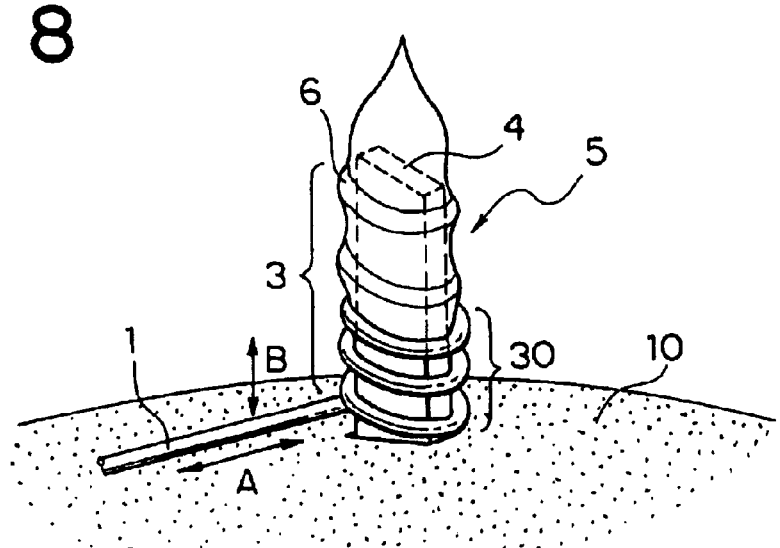

RESOLVER STATOR

BACKGROUND OF THE INVENTION

1. Field of the Invention

The present invention relates to a resolver stator. In particular, the present invention relates to a resolver stator which uses a soft resin, such as silicone, instead of an epoxy which has been used in a known technology for a varnish for fixing a stator coil, thereby preventing the stator coil and wires between the stator coil and terminals from disconnection caused by cracks and the like of the varnish, which are produced when used in an environment in which temperature varies in a wide range.

2. Description of the Related Art

In a known resolver stator, a stator coil wound around magnetic poles of the resolver stator is generally impregnated with a varnish using an epoxy, the varnish being dried and cured, for fixing the stator coil to the resolver stator.

A melted resin covers the overall stator coil including terminals and is cured.

The known resolver stator having the above configuration has problems described below.

When the resolver stator is used in an environment in which temperature varies in a wide range, cracks which cause disconnection of the stator coil are produced due to degradation at high temperature and expansion/contraction caused by variation in temperature because the stator coil is affixed by using a varnish including a hard epoxy.

In manufacturing a known stator coil, the varnish must be cured at a high temperature; therefore, a temperature-controlled bath is necessary and manufacturing costs are increased because of the temperature control.

Wire ends of the stator coil are exposed from the resin which covers the overall stator coil including terminals. Therefore, there is a risk in that the wire ends of the stator coil are broken at exposed parts thereof by vibration or expansion/contraction applied to the stator coil, which causes disconnection.

SUMMARY OF THE INVENTION

Accordingly, it is an object of the present invention to provide a resolver stator which is improved by using a soft resin, such as silicone, thereby preventing the stator coil and wires between the stator coil and terminals from disconnection caused by cracks and the like of the varnish, which are produced when used in an environment in which temperature varies in a wide range.

To the end, according to an aspect of the present invention, a resolver stator comprises a stator coil including a plurality of winding portions each wound around a magnetic pole via ring-shaped insulation caps, the stator coil being impregnated with a liquid or melted resin and fixed to the magnetic poles by curing the resin. The resin is softer than an epoxy. The resin may be silicone. A peripheral part of one of the ring-shaped insulation caps may be provided with a plurality of terminals. Wire ends of the stator coil may be each wound around one of the plurality of terminals such that each wire end and the terminal form a winding-connecting part. The wire end and the terminal may be fixed to each other by soldering or fusing at one portion of the winding-connecting part and be independent from each other at the remaining portion of the winding-connecting part such that the wire end disposed in the remaining portion of the winding-connecting part is formed as a free wire end. The free wire end may be wound around the terminal at least once. The free wire end may be wound around the terminal a plurality of times. The free wire end may have a resilient function and slack.

The resolver stator according to the present invention offers advantages described below.

The stator coil is fixed to the magnetic poles of the resolver stator via a resin, such as silicone, which is softer than that of an epoxy which is used for a known resolver stator. The resin such as silicone has elasticity even when the temperature at which the resolver stator is used varies in a wide range. Therefore, disconnection in the stator coil is avoided, and the resolver stator can be reliably used regardless of operational environment.

Since the resin such as silicone is elastic, it is not necessary to accurately control the amount of application of the resin, and the apparatus to be used for impregnation of the resin is not complex, whereby manufacturing costs are reduced.

Since the resin is cured by natural drying, temperature control is not necessary for curing, whereby manufacturing costs are reduced.

A part of the wire end of the stator coil wound around the terminal provided at the ring-shaped insulation cap is not fixed to the terminal and has a slack so as to have a resilient function. Therefore, deformation due to thermal expansion, vibration, and the like can be absorbed, whereby disconnection can be avoided, and a reliable resolver stator is obtainable.

BRIEF DESCRIPTION OF THE DRAWINGS

FIG. 6 is a perspective view of an end of a wire of the stator coil shown in FIG. 3;

FIG. 7 is a perspective view of the terminal wound with the wire of the stator coil shown in FIG. 3; and FIG. 8 is a perspective view of the terminal in which the wound wire is fixed to the terminal by soldering.

DESCRIPTION OF THE PREFERRED EMBODIMENTS

Preferred embodiments of a resolver stator, according to the present invention, are described below with reference to the drawings.

Figure 1:
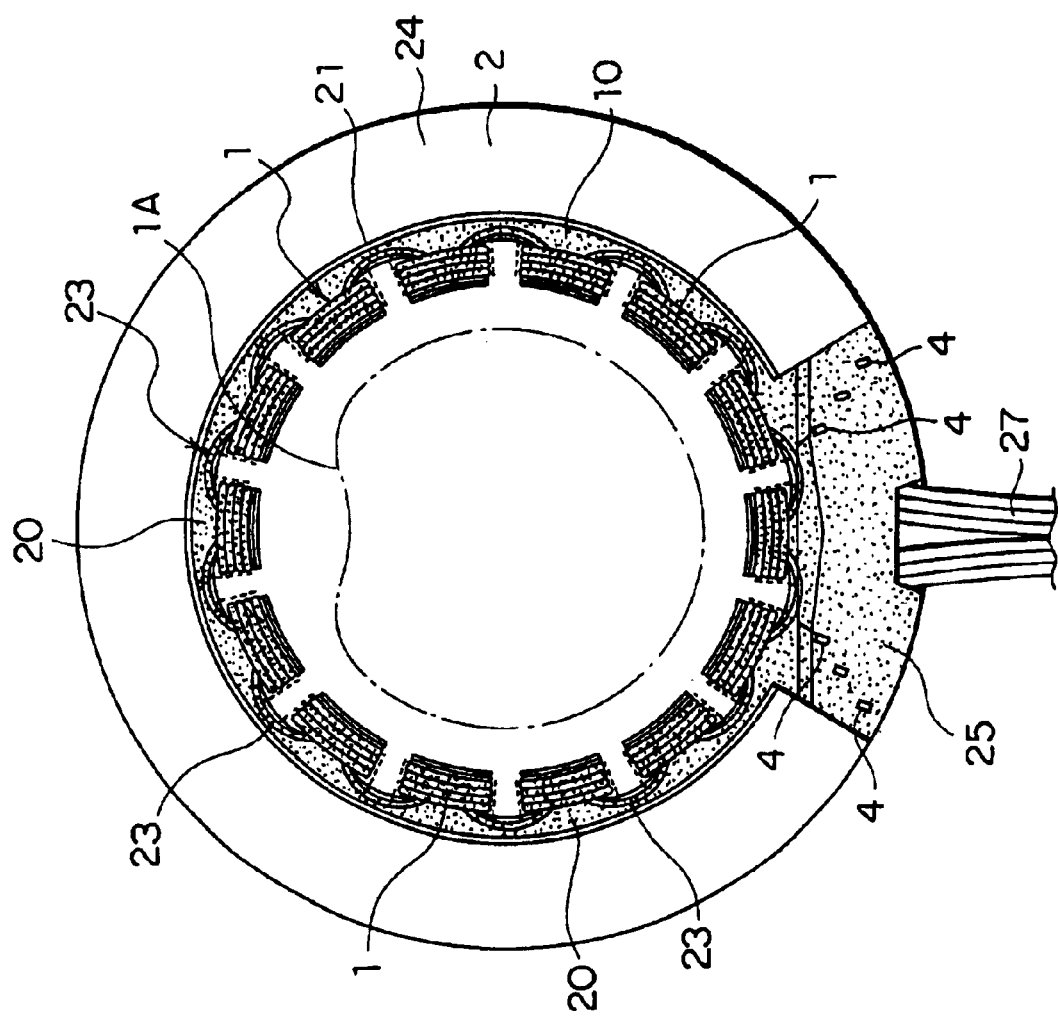
FIG. 1 is a plan view of a resolver stator according to an embodiment of the present invention.

A resolver stator 2 shown in FIG. 1 includes a stator coil 1 of which winding portions are each wound via ring-shaped insulation caps 21 and 22 around a magnetic pole 20 which is a steel core. In FIG. 1, a rotor 1A is disposed inside the resolver stator 2. The winding portions of the stator coil 1 wound around the magnetic poles 20 are connected in series to each other via crossover wires 23.

A peripheral part 25, which is a part of the ring-shaped insulation cap 21 protruding in a radial direction, is positioned in a part of a rim 24 of the resolver stator 2. The peripheral part 25 is provided with terminals 4 standing at the peripheral part 25.

Figure 4:
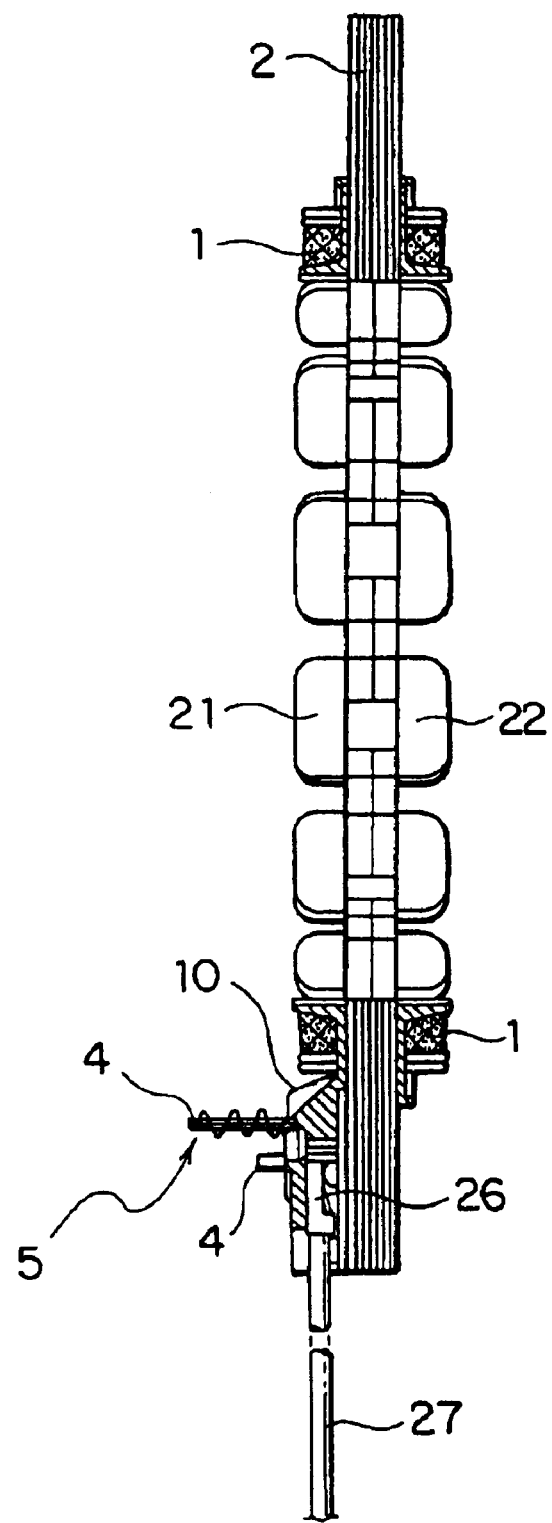
FIG. 4 is a sectional view of the resolver stator shown in FIG. 3.
Figure 5:
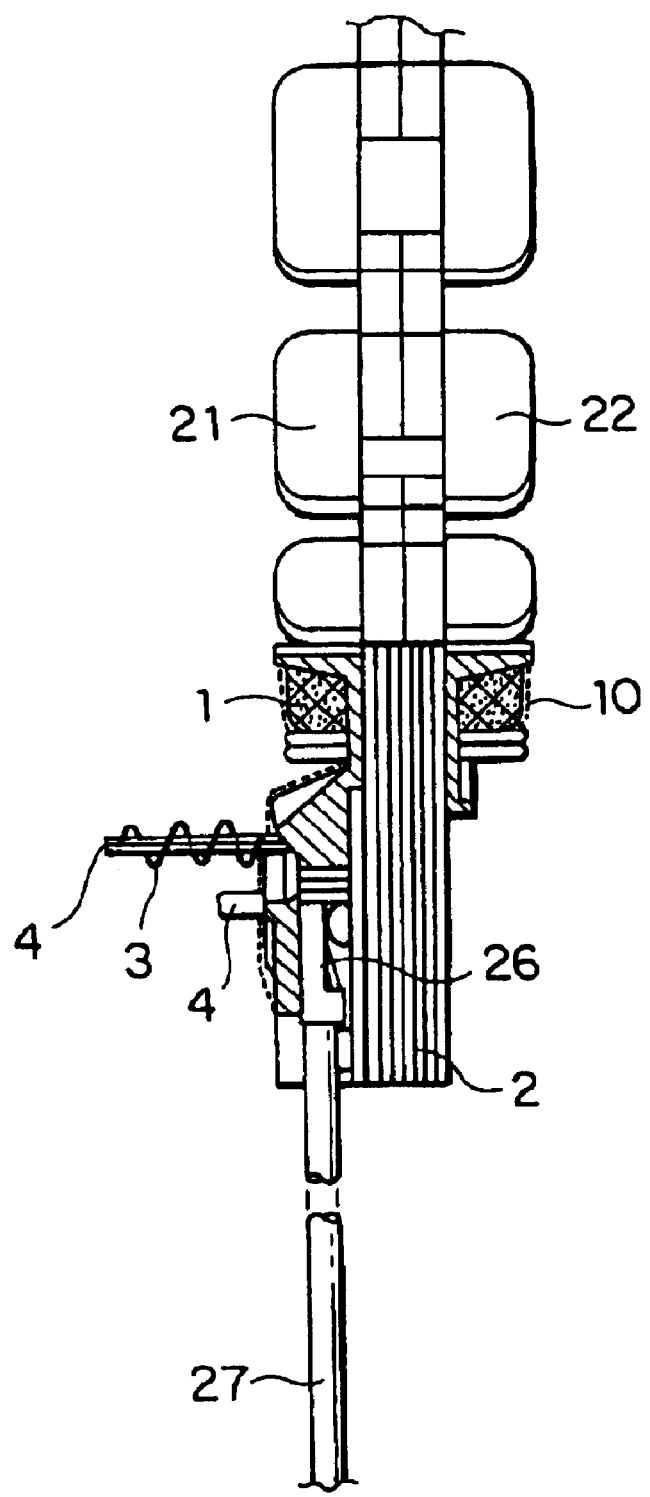
FIG. 5 is an expanded view of a critical portion of the resolver stator shown in FIG. 4.

The terminals 4 are each formed integrally with a base 26 such that the each terminal 4 and the base 26 are connected to each other in an L-shape, as shown in FIG. 4. Each base 26 is connected to a lead wire 27. The terminals 4 protrude to the outside, each passing through a hole (not shown) formed in the peripheral part 25.

A liquid or melted resin 10 is applied to the surfaces of the magnetic poles 20 and the peripheral part 25 by potting or the like. The stator coil 1 provided on the magnetic poles 20 is impregnated with the resin 10 and is fixed to the magnetic poles 20 at the winding portions of the stator coil 1. The terminals 4 are affixed at the peripheral part 25.

Figure 2:
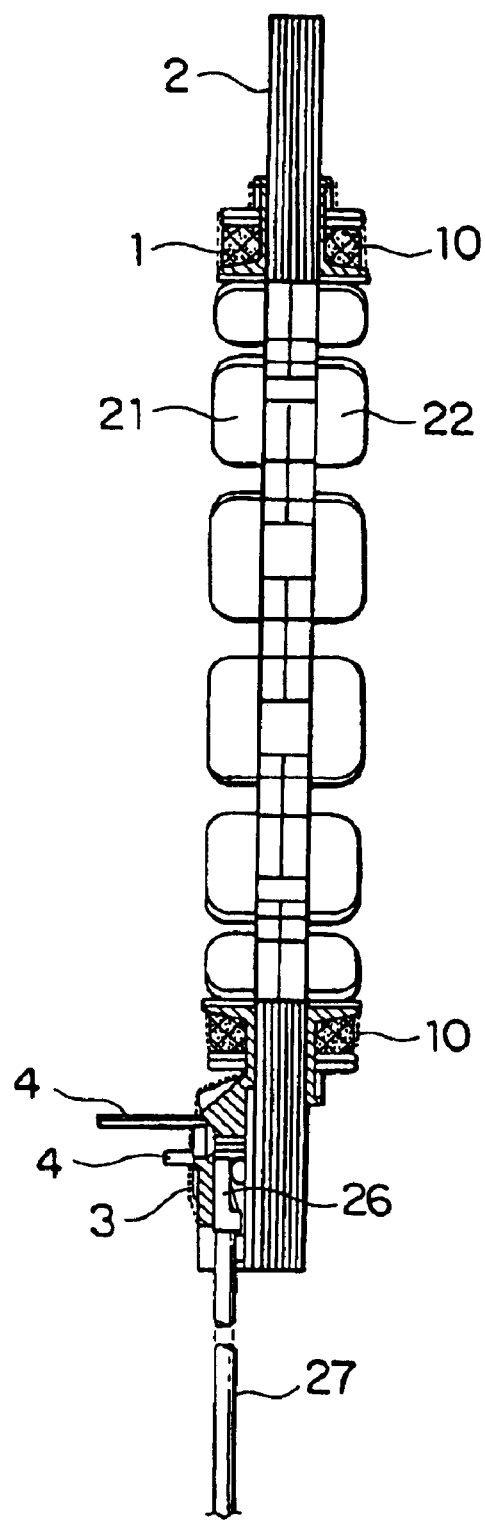
FIG. 2 is a sectional view of the resolver stator shown in FIG. 1.
Figure 3:
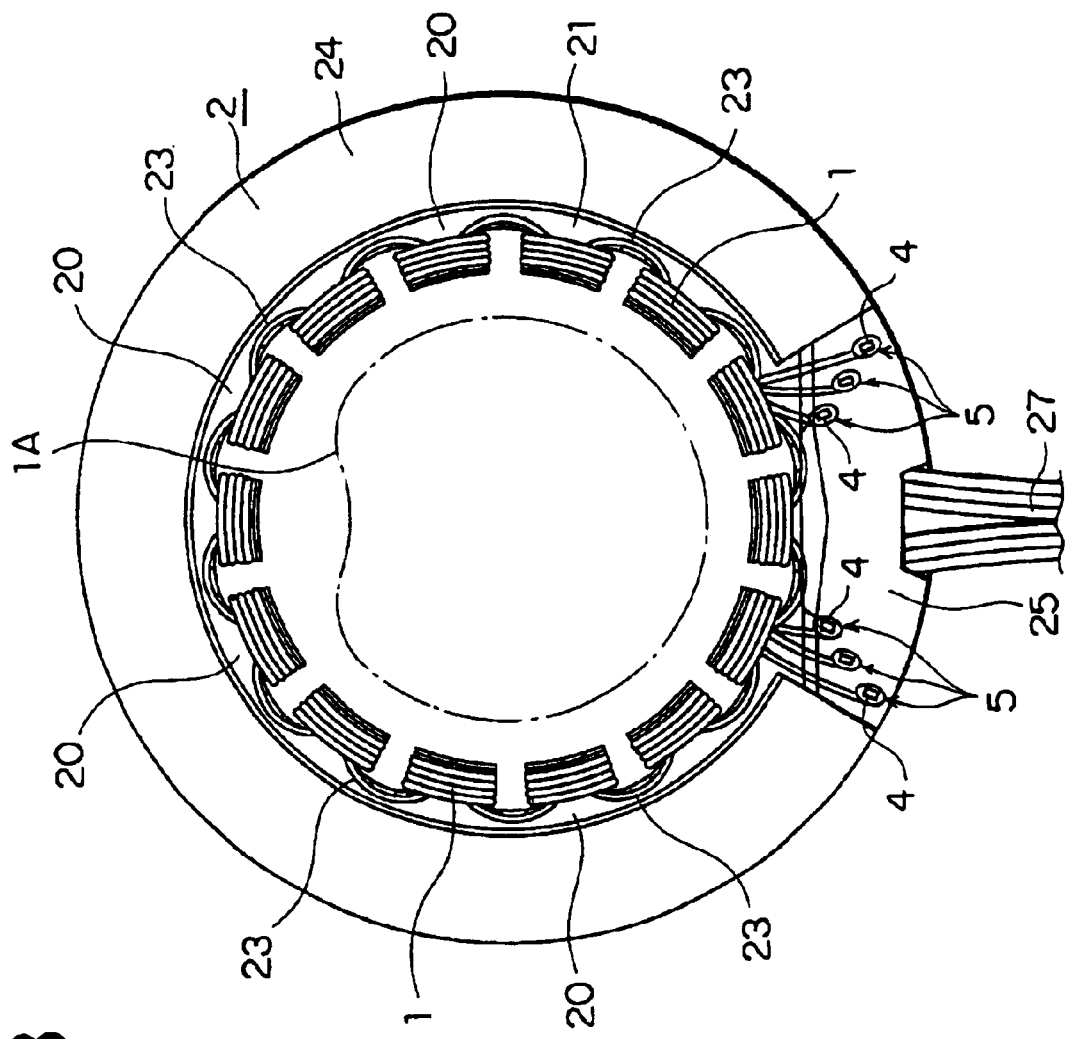
FIG. 3 is a plan view of the resolver stator shown in FIG. 1, in which terminals are connected to a stator coil at wire ends thereof.

In FIGS. 1 and 2, the resin 10 is applied to dotted parts of the resolver stator 2. The resin 10 is, for example, silicone which is softer than an epoxy which forms a known varnish. It is not necessary to cure the resin 10 at a high temperature after being applied to the resolver stator 2, as in a case of the known varnish, and the resin 10 moves into a slightly elastic solid state by natural curing.

Since the resin 10 is sufficiently elastic so as not to be cracked when the resolver stator 2 is used in an environment in which temperature varies in a wide range.

In FIGS. 3 to 8, wire ends of the stator coil 1 are wound around the terminals 4 and are fixed to the terminals 4 by solder 6 or by fusing (including an arc welding or spot welding).

Each wire end 3 (see FIG. 6) of the stator coil 1 wound around the magnetic poles 20 is wound around the terminal 4 a plurality of times, as shown in FIG. 7. The terminal 4 and the wire end 3 form a winding-connecting part 5.

The wire end 3 wound around the terminal 4 is affixed by the solder 6 or by fusing at one portion of the winding-connecting part 5, and is left free from the terminal 4, as a free end 30, at the remaining portion of the winding-connecting part 5 without being fixed to the terminal 4, as shown in FIG. 8, instead of fixing the overall wire end 3 to the terminal 4 at the winding-connecting part 5 by the solder 6 or the like.

In FIG. 8, when the stator coil 1 extends in a direction A due to heat or vibration received from the outside in the direction A or in a direction B perpendicular to the direction A, the extension and the vibration can be substantially absorbed by a resilient function and a slack of the free end 30 because the free end 30 is wound around the terminal 4 a plurality of times and has a function of a spring, whereby breakages of the wire end 3 or disconnection can be avoided.

The free end 30 may have the function of a spring when the wire end 3 is wound one time or less than one time, for example, by 300 degrees or 250 degrees, instead of being wound a plurality of times.

What is claimed is:

1. A resolver stator comprising:
a stator coil including a plurality of winding portions each wound around a magnetic pole via ring-shaped insulation caps, the stator coil being impregnated with a liquid or melted resin and fixed to the magnetic poles by curing the resin, wherein:
the resin is softer than an epoxy; and
a peripheral part of one of the ring-shaped insulation caps is provided with a plurality of terminals, wire ends of the stator coil are each wound around one of the plurality of terminals such that each wire end and the terminal form a winding-connecting part, and the wire end and the terminal are fixed to each other by soldering or fusing at one portion of the winding-connecting part and are independent from each other at the remaining portion of the winding-connecting part such that the wire end disposed in the remaining portion of the winding-connecting part is formed as a free wire end.

2. A resolver stator comprising:
a stator coil including a plurality of winding portions each wound around a magnetic pole via ring-shaped insulation caps, the stator coil being impregnated with a liquid or melted resin and fixed to the magnetic voles by curing the resin, wherein
the resin is softer than an epoxy;
the resin is silicone; and
a peripheral part of one of the ring-shaped insulation caps is provided with a plurality of terminals, wire ends of the stator coil are each wound around one of the plurality of terminals such that each wire end and the terminal form a winding-connecting part, and the wire end and the terminal are fixed to each other by soldering or fusing at one portion of the winding-connecting part and are independent from each other at the remaining portion of the winding-connecting part such that the wire end disposed at the remaining portion of the winding-connecting part is formed as a free wire end.

3. A resolver stator according to claim 1, wherein the free wire end is wound around the terminal at least once.

4. A resolver stator according to claim 2, wherein the free wire end is wound around the terminal at least once.

5. A resolver stator according to claim 1, wherein the free wire end is wound around the terminal a plurality of times.

6. A resolver stator according to claim 2, wherein the free wire end is wound around the terminal a plurality of times.

7. A resolver stator according to claim 1, wherein the free wire end has a resilient function and slack.

8. A resolver stator according to claim 1, wherein the resin remains soft after the curing is complete.

9. A resolver stator according to claim 2, wherein the free wire end has a resilient function and slack.

10. A resolver stator according to claim 2, wherein the resin remains soft after the curing is complete.

* * * * *